(12) United States Patent
Kim et al.

(10) Patent No.: US 11,984,284 B2
(45) Date of Patent: May 14, 2024

(54) EARTH LEAKAGE BREAKER HAVING BUILT-IN TRIP MODULE TYPE CIRCUIT BREAKER

(71) Applicant: DONG-A ELECTRIC CO., LTD., Busan (KR)

(72) Inventors: Tae Woo Kim, Busan (KR); Chul Bum Joo, Busan (KR); Eun Sik Park, Busan (KR)

(73) Assignee: DONG-A ELECTRIC CO., LTD. (KR)

( * ) Notice: Subject to any disclaimer, the term of this patent is extended or adjusted under 35 U.S.C. 154(b) by 267 days.

(21) Appl. No.: 17/704,246

(22) Filed: Mar. 25, 2022

(65) Prior Publication Data

US 2023/0290600 A1 Sep. 14, 2023

Related U.S. Application Data

(63) Continuation of application No. PCT/KR2022/004110, filed on Mar. 24, 2022.

(30) Foreign Application Priority Data

Mar. 11, 2022 (KR) .......................... 10-2022-0030518

(51) Int. Cl.
*H01H 83/02* (2006.01)
*H01H 83/06* (2006.01)
*H01H 83/20* (2006.01)
*H02H 3/16* (2006.01)

(52) U.S. Cl.
CPC ............ *H01H 83/02* (2013.01); *H01H 83/06* (2013.01); *H01H 83/20* (2013.01); *H02H 3/16* (2013.01)

(58) Field of Classification Search
CPC ........ H01H 83/02; H01H 83/06; H01H 83/20; H01H 83/04; H01H 83/144; H02H 3/16; H02H 3/44; H02H 3/33
See application file for complete search history.

(56) References Cited

U.S. PATENT DOCUMENTS

2014/0118001 A1 * 5/2014 Bang ...................... H02H 3/093
324/537

FOREIGN PATENT DOCUMENTS

| DE | 112012001189 B4 * | 8/2021 | ......... G01R 31/1227 |
| JP | 2017199676 A * | 11/2017 | ............. G01R 15/18 |
| KR | 101846221 B1 * | 4/2018 | |

* cited by examiner

*Primary Examiner* — Mohamad A Musleh
(74) *Attorney, Agent, or Firm* — Park & Associates IP Law Office

(57) ABSTRACT

Proposed is an earth leakage breaker having a built-in trip module type circuit breaker, which is installed at a line between a power supply and a load and has a trip module configured to cut the line off, the earth leakage breaker including: a CT installed on the line and configured to monitor an instantaneous current; and a control circuit unit comprising: an operation module configured to receive an instantaneous current sensed by the CT, to measure an instantaneous current value per unit time, and to calculate a slope of the instantaneous current per unit time; a determination module configured to determine a case as an overload state, the case having the slope exceeding an overcurrent determination value A, and to cause an overload state determination signal to be output; and an output module configured to output a trip module actuation signal according to the overload state determination signal of the determination module and to cut off the line, and accordingly, the earth leakage breaker causes the trip module to be actuated according to an instantaneous current slope.

10 Claims, 7 Drawing Sheets

EARTH LEAKAGE BREAKER HAVING BUILT-IN TRIP MODULE TYPE CIRCUIT BREAKER

REFERENCE TO RELATED APPLICATIONS

This is a continuation of International Patent Application PCT/KR2022/004110 filed on Mar. 24, 2022, which designates the United States and claims priority of Korean Patent Application No. 10-2022-0030518 filed on Mar. 11, 2022, the entire contents of which are incorporated herein by reference.

FIELD OF THE INVENTION

The present disclosure relates to an earth leakage breaker having a built-in trip module type circuit breaker and, more particularly, to a device having a built-in control circuit unit that measures a slope value of an instantaneous current in real time to determine whether there is an overcurrent and performs a circuit breaker function configured to control a trip module.

BACKGROUND OF THE INVENTION

A circuit breaker is installed between a power source and a load and, when an overcurrent flows due to an abnormality in load devices, quickly performs a role of cutting off power to protect other devices.

In general, a circuit breaker of a bimetal structure is generally built-in in an earth leakage breaker.

However, a time point when the circuit breaker is operated in such an earth leakage breaker depends on a temperature due to heating, and the circuit breaker is actuated without taking into consideration a power phase angle. Therefore, a cutting off operation may be performed when a large current flows according to the phase angle of the power, so there is a risk of damaging internal components due to arcing.

On the other hand, a trip module provided in a combination of a solenoid and a mechanical structure actuated by the solenoid is provided in the earth leakage breaker and performs an operation of cutting off power according to a solenoid actuation signal, wherein each individual device has a solenoid response error and a mechanical actuation error.

When the actuation error is observed on the basis of a period of an AC input, each individual device develops a large actuation error, whereby there is a problem in that it is difficult to input an accurate actuation control time in advance.

Therefore, in the related art, each unit device has an independent trip module actuation error in a ground leakage breaker. Accordingly, there is a problem in that it is difficult to cut the power off by precisely selecting the time point with the trip module when the AC instantaneous current is zero.

SUMMARY OF THE INVENTION

Accordingly, the present disclosure has been made keeping in mind the above problems occurring in the related art, and an objective of the present disclosure is to provide an earth leakage breaker configured to precisely cut a circuit off when the instantaneous current is zero by monitoring an instantaneous current using a trip module having no bimetal and included in the earth leakage breaker.

In order to accomplish the above objective, there may be provided an earth leakage breaker having a built-in trip module type circuit breaker as the gist of the present disclosure, the earth leakage breaker including: a CT installed on the line and configured to monitor an instantaneous current; and a control circuit unit including: an operation module configured to receive an instantaneous current sensed by the CT, to measure an instantaneous current value per unit time, and to calculate a slope of the instantaneous current per unit time; a determination module configured to determine a case as an overload state, the case having the slope exceeding an overcurrent determination value A, and to cause an overload state determination signal to be output; and an output module configured to output a trip module actuation signal according to the overload state determination signal of the determination module and to cut the line off, wherein the earth leakage breaker thus causes the trip module to be actuated according to an instantaneous current slope.

Here, the determination module may output the overload state determination signal only when the instantaneous current continuously exceeds the overcurrent determination value A during a set overcurrent determination time T.

In addition, the output module may control and output the trip module actuation signal so that the power may be cut off at a time (expressed as ZC hereinafter) when the instantaneous current becomes zero.

In addition, in the case of $ZC_n \leq T_F \leq ZC_{n+1} - T_{trip}$, a trip module actuation signal may be output after the $T_{off}$ is delayed in time to $ZC_{n+1} - T_{trip}$ so that the power may be cut off at $ZC_{n+1}$ where the instantaneous current value becomes zero, wherein $ZC_n$: Time when a previous instantaneous current value is zero, $ZC_{n+1}$: Time when an instantaneous current value is zero after $ZC_n$, $T_{trip}$: Trip module actuation time margin, $T_{off}$: Trip module actuation signal output time, and $T_F$: Overload state determination time.

In addition, in a time interval from $ZC_n$ to $ZC_{n+1}$, in the case of $ZC_{n+1} - T_{trip} \leq T_F \leq ZC_{n+1}$, the trip module actuation signal may be caused to be immediately output at $T_{off}$ to allow a trip contact to be accomplished in a low current region, wherein $ZC_n$: Time when a previous instantaneous current value is zero, $ZC_{n+1}$: Time when an instantaneous current value is zero after $ZC_n$, $T_{trip}$: Trip module actuation time margin, $T_{off}$: Trip module actuation signal output time, and $T_F$: Overload state determination time.

In addition, in a time interval from $ZC_n$ to $ZC_{n+1}$, in the case of $ZC_{n+1} - T_{trip} \leq T_F \leq ZC_{n+1}$, the trip module actuation signal may be caused to be output after the $T_{off}$ is delayed in time to $ZC_{n+2} - T_{trip}$ so that the power may be cut off at $ZC_{n+1}$ when the instantaneous current value becomes zero, wherein $ZC_n$: Time when a previous instantaneous current value is zero, $ZC_{n+1}$: Time when an instantaneous current value is zero after $ZC_n$, $ZC_{n+2}$: Time when an instantaneous current value is zero after $ZC_{n+1}$, $T_{trip}$: Trip module actuation time margin, $T_{off}$: Trip module actuation signal output time, and $T_F$: Overload state determination time.

In addition, the control circuit unit may include a unit time setting input unit configured to divide a period of the instantaneous current, thereby being capable of regulating time resolution for overload determination.

In addition, the control circuit unit may include a T value setting input unit configured to set an over current determination time T, thereby being capable of regulating a noise determination value.

In addition, the control circuit unit may include an actuation current setting unit configured to set an overcurrent determination value A.

In addition, the control circuit unit may further include: a test button configured to test the actuation of the trip module; and a trip module actuation time setting unit configured to calculate and store a time from a start of actuation of the test button to a cut-off of power, and the control circuit unit may be thus capable of automatically collecting a trip module actuation time margin $T_{trip}$.

As described above, there is an advantage of providing, by the present disclosure, an earth leakage breaker having a built-in trip module type circuit breaker configured to precisely cut a circuit off when the instantaneous current is zero by monitoring an instantaneous current using a trip module having no bimetal and included in the earth leakage breaker.

DETAILED DESCRIPTION OF THE INVENTION

Hereinafter, the present disclosure will be described with reference to the drawings, and in the description of the present disclosure, when it is determined that a detailed description of a related known technology or configuration may unnecessarily obfuscate the gist of the present disclosure, the detailed description thereof will be omitted.

In addition, terms described below are the terms defined in consideration of functions in the present disclosure, which may vary depending on a user, an intention or a custom of an operator, so a definition of each of the terms should be made on the basis of the content throughout the present specification describing the present disclosure.

Figure 1:
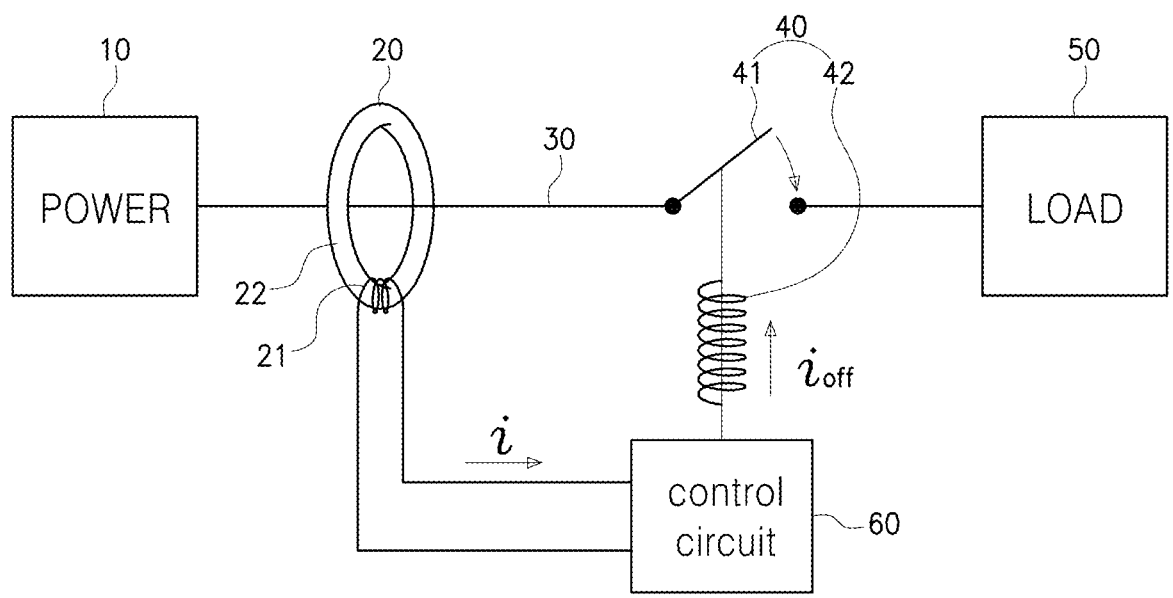
FIG. 1 is a structural diagram of the present disclosure.
Figure 2:
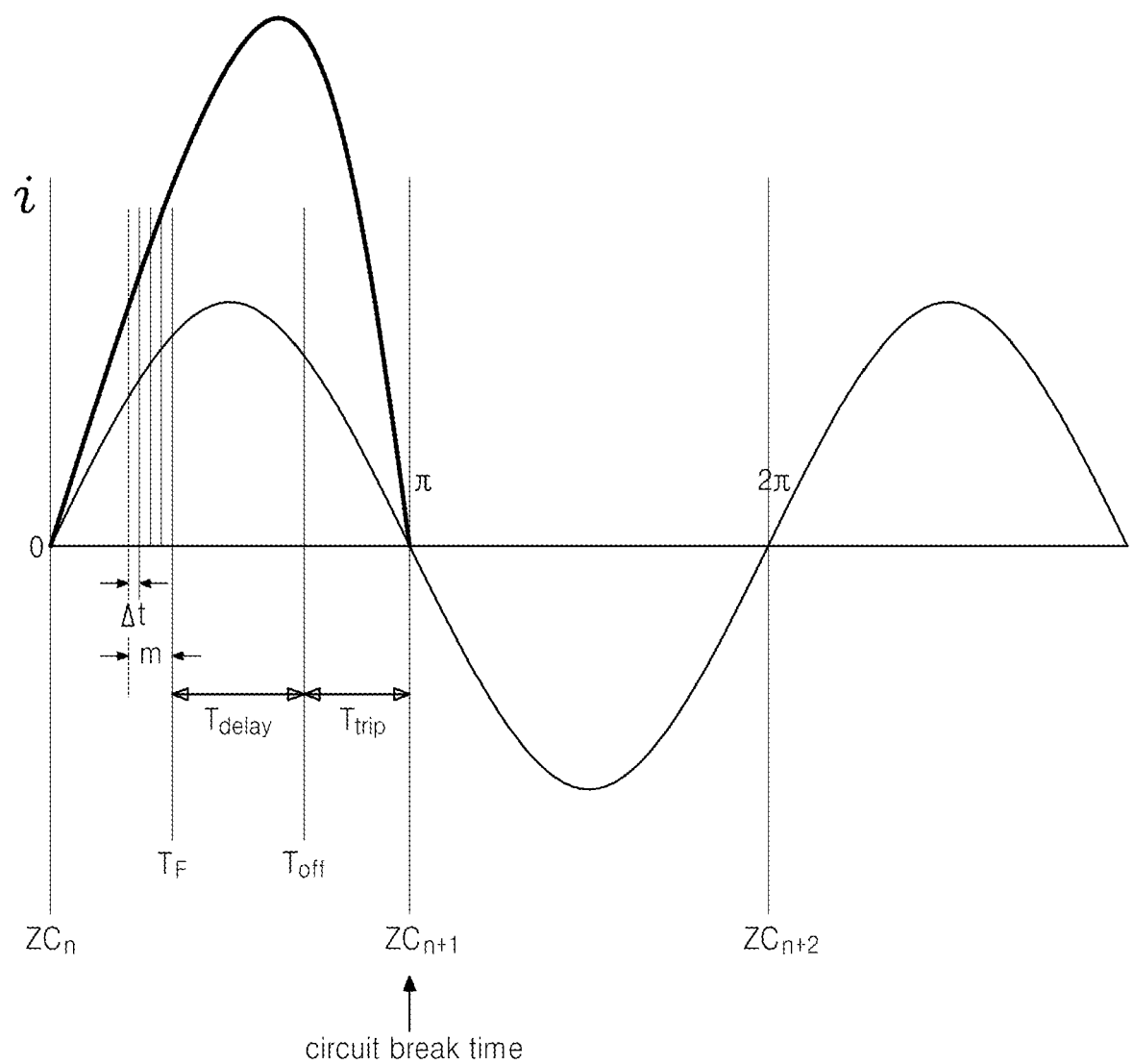
FIGS. 2 to 4 are graphs showing implementing states of the present disclosure.
Figure 3:
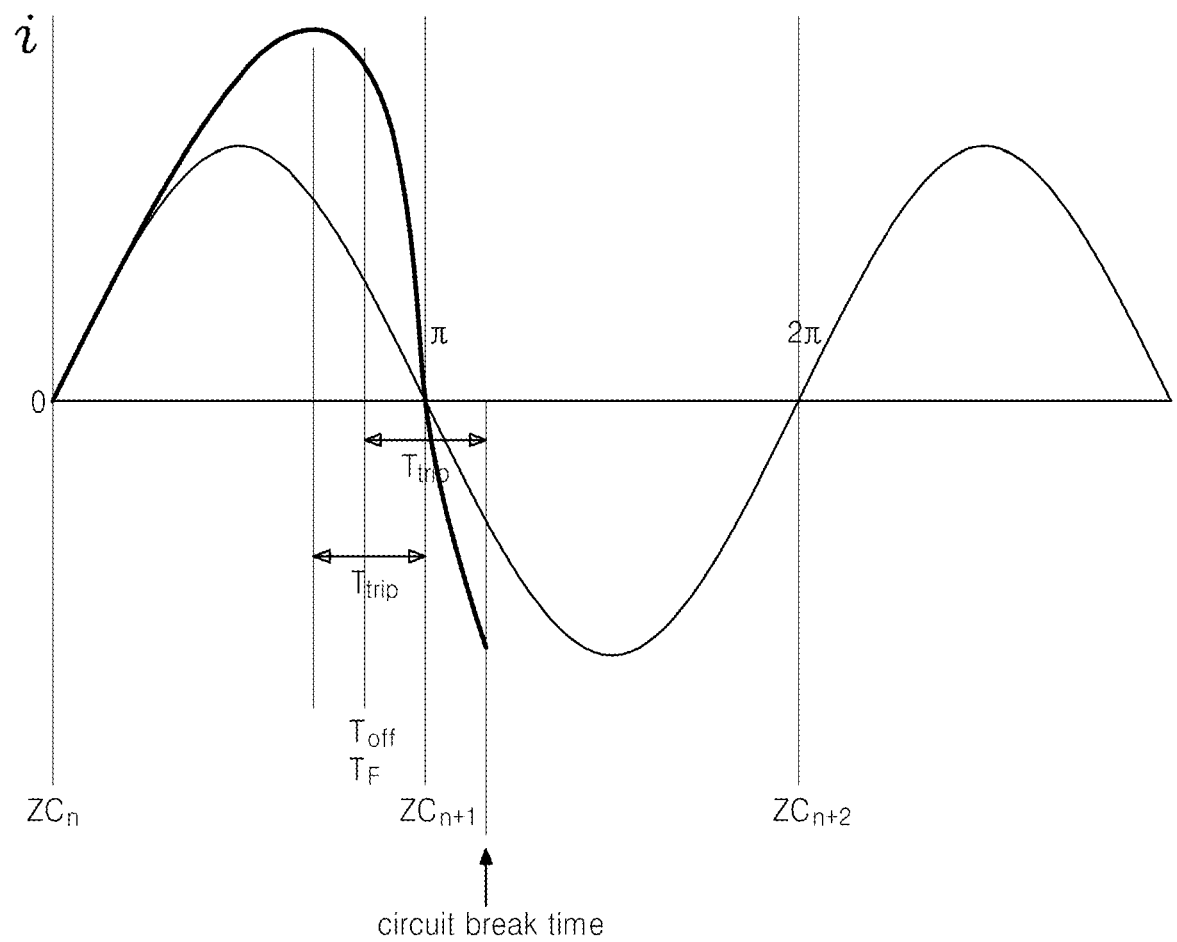
Figure 4:
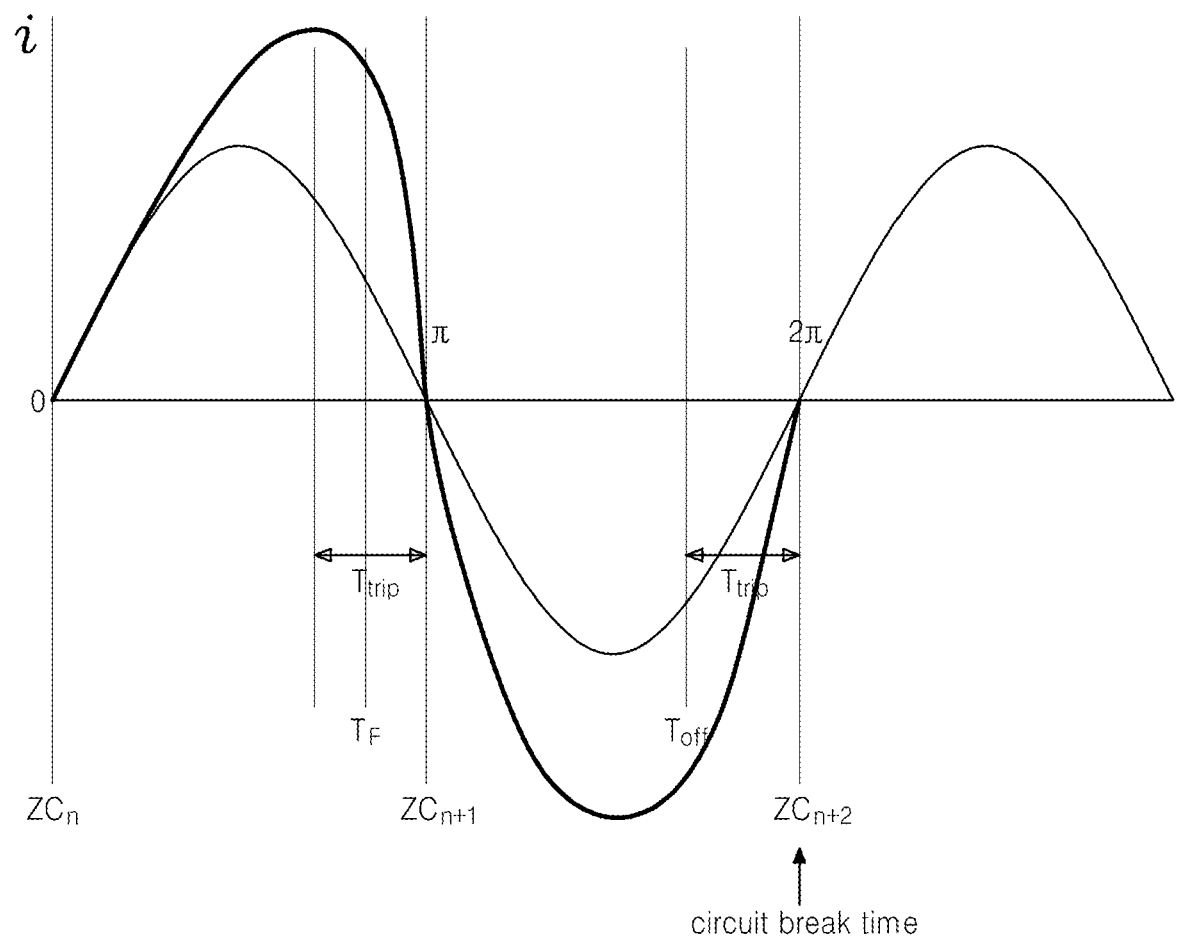
Figure 5:
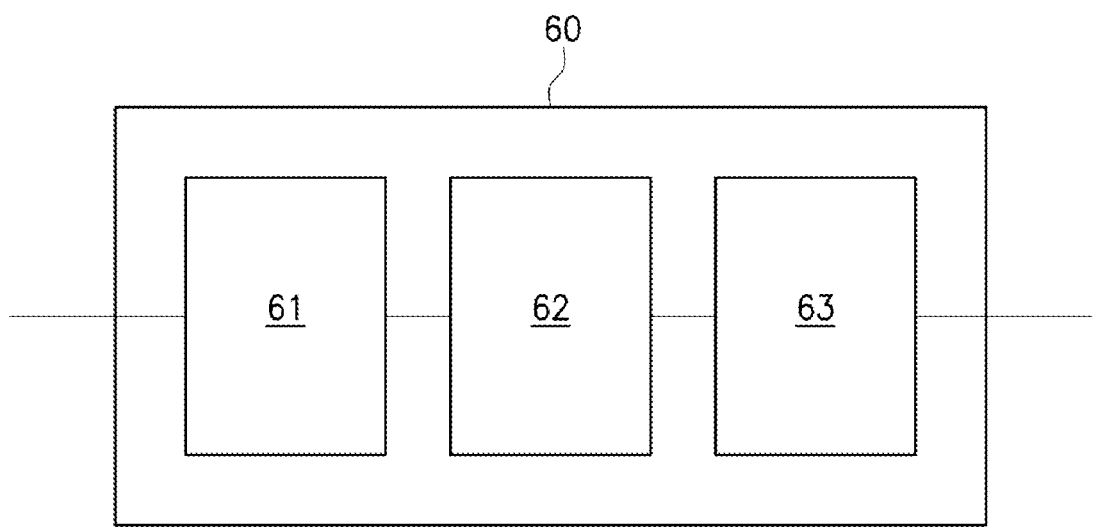
FIG. 5 is an internal block diagram of a control circuit unit of the present disclosure.
Figure 6:
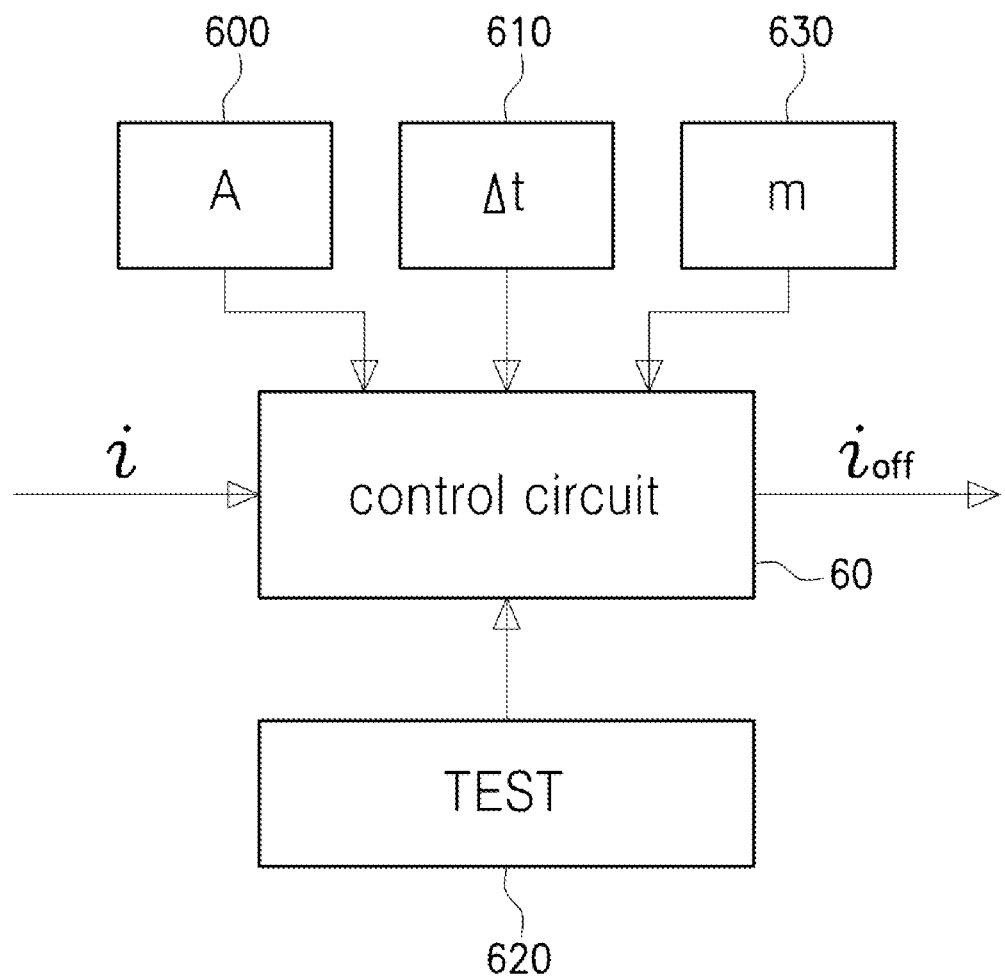
FIG. 6 is an external block diagram of the control circuit of the present disclosure.
Figure 7:
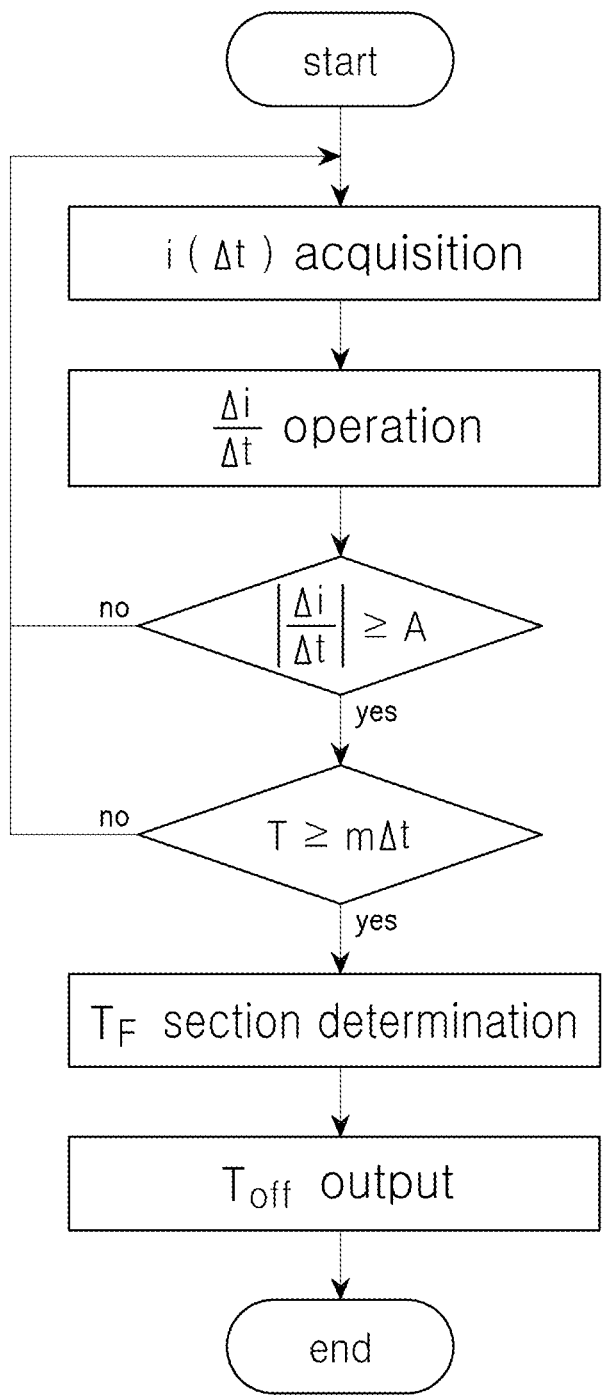
FIG. 7 is a control flowchart for an embodiment of the present disclosure.

For drawings below, FIG. 1 is a structural diagram of the present disclosure, FIGS. 2 to 4 are graphs showing implementing states of the present disclosure, FIG. 5 is an internal block diagram of a control circuit unit of the present disclosure, FIG. 6 is an external block diagram of the control circuit of the present disclosure, and FIG. 7 is a control flowchart for an embodiment of the present disclosure.

As shown in FIG. 1, the present disclosure relates to an earth leakage breaker having a built-in trip module type circuit breaker, the earth leakage breaker including: a trip module 40; a current transformer (CT) 20; and a control circuit unit 60 including an operation module 61, a determination module 62, and an output module 63.

In general, the earth leakage breaker is installed at a line 30 between a power supply 10 and a load 50 and includes a trip module 40 configured to cut the line off and a CT 20 configured to monitor a line instantaneous current.

In the present disclosure, the CT 20 is composed of a core 22 coupled to an active line and a core coil 21 and is configured to sense an instantaneous current i.

The trip module 40 is a device including a solenoid 42 and a trip switch 41 actuated by same, of a general earth leakage breaker.

An output terminal of the CT 20 is connected to the control circuit unit 60 of the present disclosure, and as shown in FIG. 5, the control circuit unit 60 may be divided into the operation module 61, the determination module 62, and the output module 63, thereby allowing same to be in blocks, respectively.

Hereinafter, an embodiment of the present disclosure will be described with reference to FIG. 7.

The operation module 61 of the present disclosure is a circuit unit configured to receive the instantaneous current i sensed by the CT 20 and measures an instantaneous current value per unit time to calculate a slope of the instantaneous current per unit time.

In one embodiment of the operation module 61, as shown in FIG. 7, when a CT 20 measured value is input, a built-in IC may output a measured current value per unit time and compare the measured current value per unit time, thereby calculating a slope of the instantaneous current per unit time.

The determination module 62 of the present disclosure is a circuit unit configured to determine a case as an overload state, the case having the slope exceeding an overcurrent determination value A, and to cause an overload state determination signal to be output.

The overcurrent determination value A is a value that is preset and input and may be changed according to the setting.

To this end, as shown in FIG. 6, an actuation current setting unit 600 capable of setting and inputting the A value may be provided in the control circuit unit 60 so that the user may freely determine the amount of an overcurrent for monitoring.

The determination module 62 may output an overload state determination signal only when the instantaneous current continuously exceeds the overcurrent determination value A during a set overcurrent determination time T.

The overcurrent determination time T may be determined by a number m of continuance of the unit time, and this is to prevent a determination error due to an instantaneous noise current jump.

The unit time $\Delta T$ is a subdivision of the period of the instantaneous current I, and a T value setting input unit 630 and a unit time setting input unit 610 are provided in the control circuit unit 60 of the present disclosure so that the user may be allowed to freely determine accuracy and monitoring resolution.

The unit time setting input unit 610 is a circuit unit configured to divide the period of the instantaneous current at equal intervals, and the more size of the unit time is reduced, the more the monitoring resolution is increased.

In the T value setting input unit 630, a value of the number m of the unit time $\Delta T$ may be input, and accordingly, as shown in FIG. 7, in a case in which the overcurrent determination time T lasts more than an m$\Delta T$ value, the case may be determined to be due to the overcurrent rather than noise, thereby reducing a judgment error with respect to the noise.

The output module 63 of the present disclosure is a circuit unit configured to output a trip module actuation signal $i_{off}$ according to the overload state determination signal of the determination module 62 and to cut the line off.

The output module 63 corresponds to a solenoid actuation circuit in a general earth leakage breaker.

In general, in an earth leakage breaker, a physical actuation time delay of the solenoid 42 and the trip switch 41 occurs from a time when the trip module actuation signal $i_{off}$ outputs to a time when power is actually cut off. For each individual device, such actuation time delay is involved in an actuation error, and thus is independently and differently provided.

In taking into consideration this, actuation of the trip module of the present disclosure will be described with reference to FIG. 2.

In FIG. 2, when symbols are defined as follows, $ZC_n$: Time when a previous instantaneous current value is zero, $ZC_{n+1}$: Time when an instantaneous current value after $ZC_n$ is zero, $ZC_{n+2}$: Time when an instantaneous current value after $ZC_{n+1}$ is zero, $T_{trip}$: Trip module actuation time margin, $T_{off}$: Trip module actuation signal output time, and $T_F$: Overload state determination time, and when the overcurrent occurs while the instantaneous current i flows, a delay time $T_{trip}$, from the trip module actuation signal output time $T_{off}$ to a time when the actual power is cut off, occurs, and the $T_{trip}$ is defined as the trip module actuation time margin.

Such a trip module actuation time margin $T_{trip}$ appears differently from each unit device to another due to a small physical fine-error and has great significance in the unit time ΔT for monitoring the instantaneous current i.

Therefore, accurate measurement of $T_{trip}$ is required for each unit earth leakage breaker. To this end, as shown in FIG. 6, the present disclosure further includes: a test button 620 configured to test the actuation of the trip module 40 in the control circuit unit 60; and a trip module actuation time setting unit (installed in the control circuit unit, not shown) configured to calculate and store a time from a start of actuation of the test button 620 to a cut-off of the power, and the present disclosure automatically collecting a trip module actuation time margin $T_{trip}$.

In an embodiment of FIG. 6, when the test button 620 is actuated, the time when the instantaneous current input becomes zero from an actuation time may be measured, whereby the trip module actuation time margin $T_{trip}$ may be determined.

As described above, the present disclosure may measure and store the trip module actuation time margin $T_{trip}$ for each device, thereby enabling independent optimal control for each device to be accomplished.

Meanwhile, the output module 63 of the present disclosure controls and outputs the trip module actuation signal $i_{off}$ so that the power is cut off at a time (ZC) when the instantaneous current becomes zero, thereby preventing arcing in the switching part.

To this end, as shown in FIG. 2, when the overload state determination time $T_F$ belongs to a section of the $ZC_n \leq T_F \leq ZC_{n+1} - T_{trip}$, the trip module actuation signal $i_{off}$ configured to be output from the output module 63 is output after the Toff is delayed in time as much as $T_{delay}$ to $ZC_{n+1} - T_{trip}$, so that the power is cut off at $ZC_{n+1}$ where the instantaneous current value becomes zero.

On the other hand, when the overload state determination time TF does not belong to the section of the $ZC_n \leq T_F \leq ZC_{n+1} - T_{trip}$, that is, when $ZC_{n+1} - T_{trip} \leq T_F \leq ZC_{n+1}$, the present disclosure may provide various control elements.

As an embodiment of the control element, when $ZC_{n+1} - T_{trip} \leq T_F \leq ZC_{n+1}$, as shown in FIG. 3, the trip module actuation signal $i_{off}$ is caused to be immediately output at $T_{off}$, thereby allowing a trip contact to be accomplished in a low current region.

In this case, the instantaneous current is not zero, so there is a concern that an arc may be generated. However, it is a relatively low current region, so there is an advantage that quick arc extinguishing is possible.

In addition, as another embodiment, when $ZC_{n+1} - T_{trip} \leq T_F \leq ZC_{n+1}$, as shown in FIG. 4, the power may be controlled to be cut off at $ZC_{n+2}$.

In this case, when heating damage during a half period is a relatively manageable amount of heat, it is a control method that takes precedence over arc prevention.

As still another embodiment, as a method of using the above embodiments in combination, when $ZC_{n+1} - T_{trip} \leq T_F \leq ZC_{n+1}$, it may be taken into consideration of selection that $i_{off}$ is caused to be immediately output at Toff or be output to allow the power to be cut off at $ZC_{n+2}$ depending on the time distance to $ZC_{n+1}$ or magnitude of a current slope.

According to the present disclosure configured as described above, a magnitude value of the instantaneous current i is monitored in real time, and the power is cut off through the trip module 40. Accordingly, there are advantages in that accessory parts such as bimetal and the like inside the earth leakage breaker may be removed, and a device in which the user may freely set current monitoring resolution, current monitoring magnitude, accuracy, and the like according to characteristics of each unit device may be provided.

The drawings shown above for the purpose of explanation of the present disclosure are one embodiment in which the present disclosure is embodied. As shown in the drawings, it may be seen that various types of combinations are possible in order to realize the gist of the present disclosure.

Therefore, the present disclosure is not limited to the above-described embodiments, and it will be said that there is the technical spirit of the present disclosure up to the scope, as claimed in the following claims, that anyone with ordinary skill in the art to which the present disclosure pertains may implement various modifications without departing from the gist of the present disclosure.

What is claimed is:

1. An earth leakage breaker having a built-in trip module type circuit breaker, which is installed at a line between a power supply and a load and has a trip module configured to cut the line off, the earth leakage breaker comprising:
   a CT installed on the line and configured to monitor an instantaneous current; and
   a control circuit unit comprising:
   an operation module configured to receive an instantaneous current sensed by the CT, to measure an instantaneous current value per unit time, and to calculate a slope of the instantaneous current per unit time;
   a determination module configured to determine a case as an overload state, the case having the slope exceeding an overcurrent determination value A, and to cause an overload state determination signal to be output; and
   an output module configured to output a trip module actuation signal according to the overload state determination signal of the determination module and to cut the line off,
   wherein the earth leakage breaker thus causes the trip module to be actuated according to an instantaneous current slope.

2. The earth leakage breaker of claim 1, wherein the determination module outputs the overload state determination signal only when the instantaneous current continuously exceeds the overcurrent determination value A during a set overcurrent determination time T.

3. The earth leakage breaker of claim 1, wherein the output module controls and outputs the trip module actuation signal so that the power is cut off at a time (expressed as ZC hereinafter) when the instantaneous current becomes zero.

4. The earth leakage breaker of claim 3, wherein, in the case of $ZC_n \leq T_F \leq ZC_{n+1} - T_{trip}$, a trip module actuation signal is output after the Toff is delayed in time to $ZC_{n+1} - T_{trip}$ so that the power is cut off at $ZC_{n+1}$ where the instantaneous current value becomes zero, wherein
$ZC_n$: Time when a previous instantaneous current value is zero,
$ZC_{n+1}$: Time when an instantaneous current value is zero after $ZC_n$,
$T_{trip}$: Trip module actuation time margin,
$T_{off}$: Trip module actuation signal output time, and
$T_F$: Overload state determination time.

5. The earth leakage breaker of claim 3, wherein, in a time interval from $ZC_n$ to $ZC_{n+1}$, in the case of $ZC_{n+1} - T_{trip} \leq T_F \leq ZC_{n+1}$, the trip module actuation signal is caused to be immediately output at $T_{off}$ to allow a trip contact to be accomplished in a low current region, wherein
$ZC_n$: Time when a previous instantaneous current value is zero,
$ZC_{n+1}$: Time when an instantaneous current value is zero after $ZC_n$,
$T_{trip}$: Trip module actuation time margin,
$T_{off}$: Trip module actuation signal output time, and
$T_F$: Overload state determination time.

6. The earth leakage breaker of claim 3, wherein in a time interval from $ZC_n$ to $ZC_{n+1}$, in the case of $ZC_{n+1} - T_{trip} \leq T_F \leq ZC_{n+1}$, the trip module actuation signal is caused to be output after the Toff is delayed in time to $ZC_{n+2} - T_{trip}$ so that the power is cut off at $ZC_{n+1}$ when the instantaneous current value becomes zero, wherein
$ZC_n$: Time when a previous instantaneous current value is zero,
$ZC_{n+1}$: Time when an instantaneous current value is zero after $ZC_n$,
$ZC_{n+2}$: Time when an instantaneous current value is zero after $ZC_{n+1}$,
$T_{trip}$: Trip module actuation time margin,
$T_{off}$: Trip module actuation signal output time, and
$T_F$: Overload state determination time.

7. The earth leakage breaker of claim 1, wherein the control circuit unit comprises a unit time setting input unit configured to divide a period of the instantaneous current, thereby being capable of regulating time resolution for overload determination.

8. The earth leakage breaker of claim 1, wherein the control circuit unit comprises a T value setting input unit configured to set an over current determination time T, thereby being capable of regulating a noise determination value.

9. The earth leakage breaker of claim 1, wherein the control circuit unit comprises an actuation current setting unit configured to set an overcurrent determination value A.

10. The earth leakage breaker of claim 1, wherein the control circuit unit further comprises:
a test button configured to test the actuation of the trip module; and
a trip module actuation time setting unit configured to calculate and store a time from a start of actuation of the test button to a cut-off of power, and
the control circuit unit is thus capable of automatically collecting a trip module actuation time margin $T_{trip}$.

* * * * *